United States Patent

[11] 3,591,800

| [72] | Inventors | Peter Kartaschoff<br>Neuchatel;<br>Pierre-Etienne Debely, Neuchatel, both of,<br>Switzerland |
|---|---|---|
| [21] | Appl. No. | 802,094 |
| [22] | Filed | Feb. 25, 1969 |
| [45] | Patented | July 6, 1971 |
| [73] | Assignee | Laboratoire Suisse De Recherches<br>Horlogeras<br>Neuchatel, Switzerland |
| [32] | Priority | Apr. 19, 1968 |
| [33] | | Switzerland |
| [31] | | 5866/68 |

[54] ATOMIC OR MOLECULAR BEAM RESONATOR HAVING FIELD CONCENTRATING MEANS FOR THE SECOND STATE SELECTOR
4 Claims, 7 Drawing Figs.

[52] U.S. Cl. .......................................... 250/41.3, 331/3
[51] Int. Cl. .......................................... G01n 27/78, H03b 3/12
[50] Field of Search.......................... 250/41.3, 41.9, 49.5; 331/3

[56] References Cited
UNITED STATES PATENTS
| 3,323,009 | 5/1967 | Holloway | 250/41.3 |
| 3,387,130 | 6/1968 | Lacey | 250/41.3 |

*Primary Examiner*—James W. Lawrence
*Assistant Examiner*—A. L. Birch
*Attorney*—Robert E. Burns

ABSTRACT: Disclosed herein is an atomic or molecular beam resonator having a source for producing the beam, a first and second state selector separated by an interaction zone, means for generating an oscillating field in the interaction zone, and a detector. The second state selector comprises by a dipolar assembly having a metallic member disposed within its field for concentrating the lines of the force of the field between the member and each of the poles of the assembly.

ATOMIC OR MOLECULAR BEAM RESONATOR HAVING FIELD CONCENTRATING MEANS FOR THE SECOND STATE SELECTOR

This invention is concerned with an atomic or molecular beam resonator.

An atomic or molecular beam resonator is a passive frequency standard based on the observation of quantum transitions between two energy states of the atoms or molecules of a given species. The measure of the radiation frequency corresponding to these transitions is characterized by a very high stability and reproducibility. A beam resonator comprises an atomic or molecular beam five following main parts: a source, the first energy state selector, an interaction region, a second energy state selector, and a detector. The speed of the particles (atoms or molecules produced by the source) depends mainly on their mass and on the temperature of the source. The first state selector selects, by deviating the trajectory, the particles of a given energy state, in such a way that only these particles can penetrate into the interaction region. In the interaction region an electromagnetic oscillating field, produced by an external generator, acts on the stream of particles in order to induce the transition from one energy state to another. The probability that these transitions take place is maximum when the frequency of the oscillating field is equal to that of the radiation corresponding to the transition. The second state selector deviates the particles which have undergone the desired transition towards the detector while the particles whose energy state has remained unchanged are not detected. The detector is a device which produces an electric signal the amplitude of which is proportional to the flux of the detected particles.

BRIEF DESCRIPTION OF THE DRAWINGS

The accompanying drawings illustrate the prior art and one embodiment of this invention. In such drawings.

The type of beam resonator most widely known is a resonator using an atomic beam of cesium, and it is to this resonator that reference will be made hereinafter to explain further the purpose of the invention.

Figure 1:
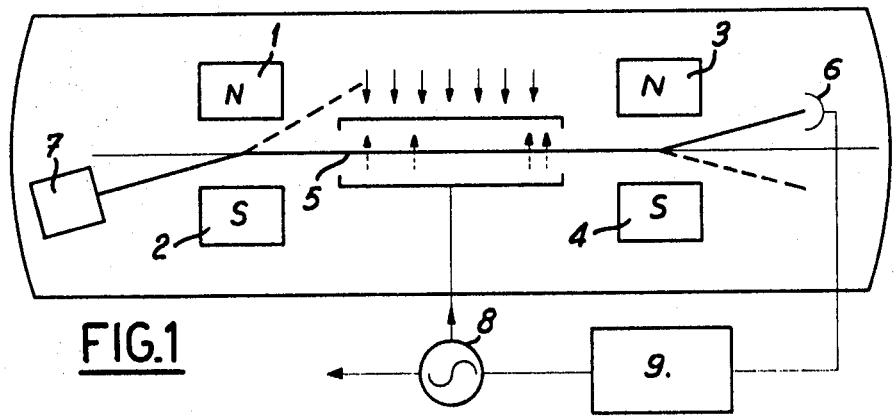
FIG. 1 is a schematic view of a prior art device.

The state selectors play a fundamental role in the output of the resonator, and, two versions of the geometry of the state selectors of a resonator have been used or proposed. The oldest such version is the resonator with dipolar selectors, derived directly from the experiments of Stern-Gerlach and illustrated in FIG. 1.

The state selectors are dipolar magnets 1, 2, 3, 4 whose magnetic field has a strong gradient perpendicular to the direction of beam 5. It is known that the force acting on an atom is equal to the gradient multiplied by the magnetic moment. By passing through the magnetic filed, the atoms undergo a simple deflection in such a way that the number N of atoms intercepted by detector 6 is proportional to the inverse of the square of the distance from source 7 to the detector. The signal-to-noise ratio observed at the detector is proportional to the square root of the detected intensity, therefore proportional to the inverse of the distance:

$N = \text{const.} \cdot (1/\rho^2)$ atoms/s $S/B = \text{const.} \cdot \left(\frac{1}{\sqrt{N}}\right) = \text{const.} \cdot (1/\rho)$ The width $\Delta\nu$ of the resonance curve observed by varying the frequency of the outer energizing generator 8 is given by the equation $\Delta\nu = 0.5(v_m/L)$ where $v_m$ is the average speed of the atoms and $L$ the effective length of the interaction region in the case of an excitation according to the method of the two separate oscillating fields (Ramsey's method). The two magnitudes $N$ and $\Delta\nu$ are important parameters determining the short term stability of the generator frequency when it is locket to the servo circuit 9 to the atomic resonance. The root mean square fluctuation for a given measurement period, for example a second, is given by the equation $$\sigma(\tau = 1s) = \text{const.} \cdot \frac{\Delta\nu}{\sqrt{N}}.$$

If it is desired to improve the stability of such a frequency standard, it is necessary to increase intensity $N$. An increase in the length serves no purpose since $\sigma$ is independent of the length of the resonator. The only way for increasing $N$ without increasing the quantity of cesium produced by the source consists in improving the efficiency of the state selectors. A known concept for this purpose is the use of quadripole or hexapole magnets as state selectors. These magnets are used currently in masers using atomic hydrogen streams. Such magnets allow the focalizing of the atoms in the upper superfine state for cesium $F=4$ and to thus obtain an intense atomic stream in the focalizing plane.

Figure 2A:
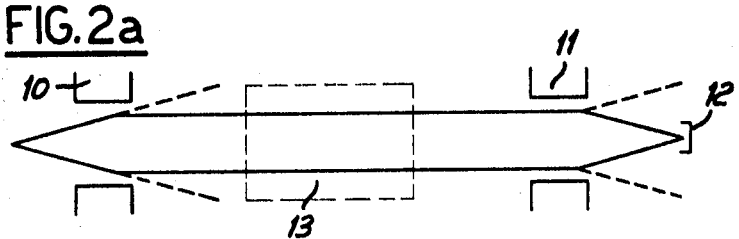
FIGS. 2a, 2b and 2c, are schematic views illustrating modifications of the device shown in FIG. 1.
Figure 2B:
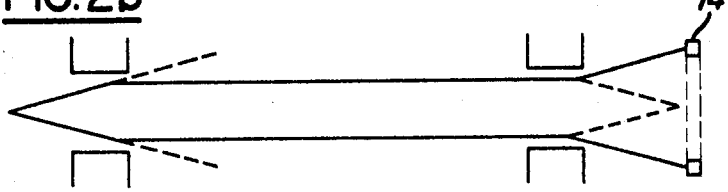
Figure 2C:
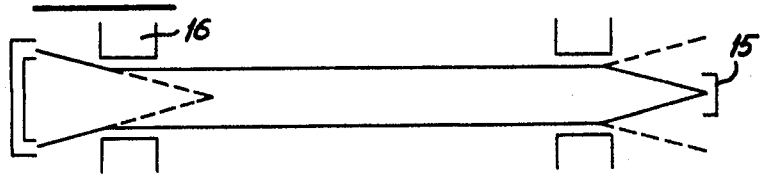

FIG. 2 shows the three versions proposed heretofore. The version 2a comprises two identical magnets 10 and 11 which focalize the atoms towards a detector 12 which has a small surface. When the transitions take place in the interaction region 13, the detected intensity decreases. The action is thus contrary to that of the system of FIG. 1. In the case of cesium, the main drawback of such a system (FIG. 2a) is the presence of atoms having other energy states which do not undergo transitions, and resulting in a high background noise.

The versions illustrated in 2b and 2c do not have this drawback since the detected intensity increases when transitions take place in the interaction region, this system being called "flip-in" by those skilled in the art by contrast to the "flop-out" system. These two modifications however have the drawback that one of the state selectors defocalizes the atomic beam.

In the case version of 2b, there is required an annular detection surface, and the cesium atoms being detected by ionization at 1000° C. on the surface, thus requiring a high heating power. Moreover, a detector for such a surface becomes very sensitive to atoms coming from all directions and it is difficult to obtain a weak background noise. Finally, the determination of the optimum dimension of the detector is delicate if it is desired to avoid the detection of atoms in other than the desired energy state.

Variant 2c renders possible the use of a small surfaced detector. However, the yield of the first state selector 16 is poor since the atoms whose initial trajectory does not lie in a plane containing the axis of the system are strongly defocalized. Owing to this fact the number of atoms detected in the case of variant 2c is not greater than a comparable dipolar system, since there is no focusing of the atoms in the desired energy state by the first state selector.

Thus, this invention aims mainly at improving the resonator performance by a new geometry.

It has for its object a resonator using an atomic or molecular beam comprising a source for producing the beam, a first and a second state selector separated by an interaction zone, means for generating an oscillating magnetic field in the said interaction zone, and a detector, characterized by the fact that the second state selector is constituted by a dipolar assembly in whose magnetic field is positioned a ferromagnetic part intended to concentrate the lines of force of the field between said piece and each of the poles.

Figure 3:
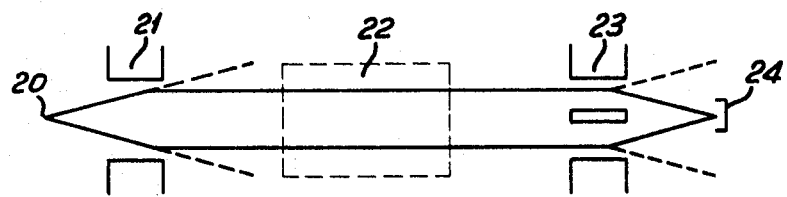
FIG. 3 shows a schematic view of a resonator embodying this invention and employing a beam of cesium.
Figure 5:
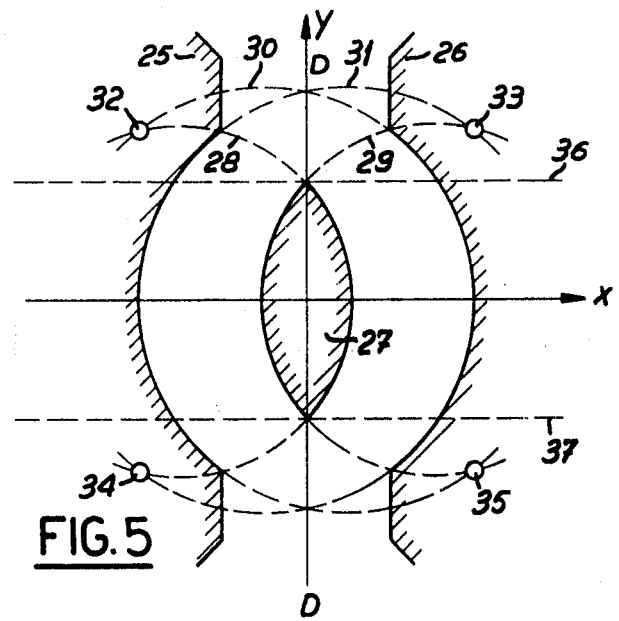
FIG. 5 shows an enlarged cross sectional view of FIG. 4.
Figure 4:
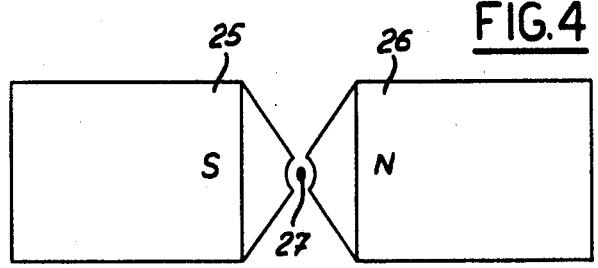
FIG. 4 shows the second state selector of the resonator of FIG. 3.

As shown in FIGS. 3—5, the resonator comprises a source 20 producing the cesium beam, a first state selector constituted by a hexapole or quadripole magnet 21, similar to those used in the prior art devices, an interaction zone 22, a second state selector 23, and a detector 24. The rest of the circuit is similar to that of FIG. 1.

The second selector 23 is constituted by a dipole magnet assembly with central pole such as shown in FIGS. 4 and 5. FIG. 4 shows the two poles 25 and 26 of the dipole magnet assembly and central pole 27. FIG. 5 shows a vertical cross section thereof perpendicular to the axis of the atomic beam. The shape of polar pieces 25, 26 and 27 is selected in such a way that they approximate the configuration corresponding to a field produced by two pairs of parallel wires. This configuration is obtained simply by cylindrical surfaces 28, 29, 30 and 31 whose two by two intersection is constituted by straight lines 32, 33, 34 and 35 parallel to the axis of the atomic beam to each half of this magnet is thus similar to a conventional dipole magnet.

This solution makes it possible to intercept about 60 percent of an almost parallel beam produced by magnet 21. The forces, to which the cesium atoms of the hyperfine state $F=3$ (atoms having undergone the transition from $F=4$ to $F=3$ are subjected,) are almost parallel to the direction X and directed towards the plane D-D containing the axis of the system. Thus in the useful zone contained between two parallel planes 36 and 37, the cesium atoms undergo a deviation towards this plane D-D and additionally a weak focalization towards the plane containing axis X. The atoms of state $F=4$ are deflected in the opposite direction and cannot reach detector 24 constituted by a ribbon positioned behind the magnet in the useful zone.

Trajectory calculations have shown that it is possible to detect 90 percent of the atoms in state $F=3$ entering in a useful zone while the detection of atoms of state $F=4$ is impossible. Additionally the detection of very rapid atoms issuing from the source and having been deflected only slightly by magnet 21 is also impossible. The background noise of the detector is thus limited to a small level due to the partial residual pressure in the high vacuum container in which is enclosed the assembly shown in FIG. 3.

The fact that the trajectories of the atoms can be calculated easily is also an advantage of the invention.

The polar central piece 27 is of high magnetic permeability, for example of an iron cobalt vanadium alloy such as is sold under the trademark name of Permendur.

The new geometry of the second state selector is naturally applicable to an electrostatic selector for a resonator using a molecular beam. In this case, poles 26, as well as central pole 27 are constituted by two metallic electrodes. The polarity of this voltage is not relevant since only the gradient of the electric field acts on the electric dipole moment of the molecules in a similar way as the gradient of the magnetic field acts on the magnetic dipole moment of the cesium atoms in the case of the cesium beam device.

However, this invention is not limited to the geometric configuration shown herein, since other configurations may be possible while embodying the invention.

We claim:

1. An atomic or molecular beam resonator comprising source means for producing said beam, first and second state selector means for deflecting said beam, separating means for providing an interaction zone separating said selector means, means for generating an oscillating magnetic field in said interaction zone, and a detector, said second state selector means comprising a two-pole magnet assembly having a magnetic field, and ferromagnetic means disposed between said two poles for concentrating the lines of force of said two-pole assembly magnetic field between said means and each of said poles of said assembly.

2. An atomic or molecular beam resonator as set forth in claim 1, wherein said resonator has an axis, and wherein the poles of said magnet assembly and said ferromagnetic means are defined by four cylindrical surfaces intersecting two by two along four lines parallel to said axis of said resonator.

3. An atomic or molecular beam resonator comprising source means for producing said beam, first and second state selector means for deflecting said beam, separating means for providing an interaction zone separating said first and second selector means, means for generating an oscillating electric field in said interaction zone, and a detector, said second state selector comprising dipolar assembly means having an electric field, and having three electrodes, one of said electrodes being positive and another negative with respect to said third electrode, said third electrode being disposed between said positive an negative electrodes.

4. An atomic beam resonator having a principal axis and comprising a source for producing said beam, first state selector means for producing a multipole magnetic field for focusing the atoms of one state of energy toward said axis, means providing an interaction zone, means for generating an oscillating magnetic field within said zone for producing transitions to another energy state having a magnetic dipole moment opposite to that of said one state of energy, second state selector means having a dipole magnet assembly comprising two concave shaped pole pieces and a convex shaped central pole piece placed in between said concave pieces for concentrating the magnetic lines of force of said assembly so that the atoms in said one energy state are deflected towards said axis in order to be detected by said detector.